US006158297A

United States Patent [19]

Polosky et al.

[11] Patent Number: 6,158,297

[45] Date of Patent: Dec. 12, 2000

[54] SURFACE MICROMACHINED COUNTER-MESHING GEARS DISCRIMINATION DEVICE

[75] Inventors: Marc A. Polosky; Ernest J. Garcia; James J. Allen, all of Albuquerque, N. Mex.

[73] Assignee: Sandia Corporation, Albuquerque, N. Mex.

[21] Appl. No.: 09/104,016

[22] Filed: Jun. 24, 1998

[51] Int. Cl.[7] .......................... E05B 63/00; E05B 65/00; F16H 1/00

[52] U.S. Cl. .............................. 74/414; 70/190; 359/230

[58] Field of Search .............................. 74/414; 70/190; 359/230

[56] References Cited

U.S. PATENT DOCUMENTS 4,099,161 7/1978 Wolski .............................. 340/825.31
5,626,040 5/1997 Benavides .............................. 70/290
5,804,084 9/1998 Nasby et al. .............................. 216/2

*Primary Examiner*—Tamara L. Graysay
*Assistant Examiner*—William C Joyce
*Attorney, Agent, or Firm*—Gregory A. Cone

[57] ABSTRACT

A surface micromachined Counter-Meshing Gears (CMG) discrimination device which functions as a mechanically coded lock. Each of two CMG has a first portion of its perimeter devoted to continuous driving teeth that mesh with respective pinion gears. Each EMG also has a second portion of its perimeter devoted to regularly spaced discrimination gear teeth that extend outwardly on at least one of three levels of the CMG. The discrimination gear teeth are designed so as to pass each other without interference only if the correct sequence of partial rotations of the CMG occurs in response to a coded series of rotations from the pinion gears. A 24 bit code is normally input to unlock the device. Once unlocked, the device provides a path for an energy or information signal to pass through the device. The device is designed to immediately lock up if any portion of the 24 bit code is incorrect.

12 Claims, 14 Drawing Sheets

SURFACE MICROMACHINED COUNTER-MESHING GEARS DISCRIMINATION DEVICE

CROSS-REFERENCE TO RELATED APPLICATIONS

Not applicable.

GOVERNMENT RIGHTS STATEMENT

This invention was made with Government support under Contract DE-AC0495AL85000 awarded by the U.S. Department of Energy. The Government has certain rights in the invention.

BACKGROUND OF THE INVENTION

This invention relates to locking mechanisms. More particularly, this invention relates to miniaturized locking mechanisms formed on a substrate with countermeshing gears that have protruding sets of discrimination gear teeth that will lock up against each other if an incorrect sequence of partial rotations of one gear past the other is provided to the lock. This type of mechanism is also called a discriminator.

A High Consequence Event is an event where an inadvertent operation of a system could result in the catastrophic loss of life, property, or damage to the environment. Such events demand safety devices of extraordinary reliability. Stronglinks are electromechanical safety devices, which serve as lock-out mechanisms. Stronglinks receive information in the form of coded drive signals and, given the correct code, provide a path for an energy or information signal to pass through the device. They are designed to survive or fail in a safe state in abnormal environments or inadvertent accidents. Traditionally, stronglinks are fabricated using conventional machining practices. They are largely custom-built machines with incredibly intricate mechanisms and tight tolerances. The attendant high cost of these ultra-reliable devices has discouraged their utilization in the marketplace.

There is a need in the art for an improved stronglink locking mechanism that retains the reliability of the present devices but does so at greatly reduced cost. This need caused the inventors herein to explore whether or not an effective discriminator mechanism for a stronglink could be fabricated using surface micromachining technology. The invention herein arose from those experiments.

BRIEF SUMMARY OF THE INVENTION

The present invention comprises two counter-meshing gears that are driven in a coded sequence past each other in response to a series of partial rotations of both gears. A first portion of the circumference of each of the gears is devoted to conventional continuous gear teeth that engage with the teeth of corresponding pinion gears that drive their respective countermeshing gears. A second portion of the circumference of each of the countermeshing gears (CMGs) carries regularly spaced sets of protruding discrimination gear teeth with at least one such gear tooth protruding from at least one of at least three levels along the vertical edge of the gear. The sets of protruding teeth on each of the CMGs is fabricated such that, if the correct sequence of partial rotations of the CMGs past each other is not followed, at least one protruding tooth from one gear will interfere with at least one protruding tooth from the other gear, thereby locking up the mechanism. Desirably, the sets of protruding teeth will be designed such that this interference will occur immediately after the first incorrect partial rotation. A pawl means is also provided to prevent backward escape rotation out of the incorrect movement. Optionally, a reset function can also be provided for the purpose of disabling the pawl. Additional means provide a path for energy or information transmission through the device to enable the operation (or shutdown) of another system that this stronglink is protecting.

DETAILED DESCRIPTION OF THE INVENTION

Micromachined devices are of interest for a number of reasons, they are smaller in size and weight, less expensive since hundreds of identical devices can be produced simultaneously, and inherently more rugged in extreme vibration and shock environments. Also, with surface micromachining (SMM) technology, no piece part assembly is needed since devices are batch fabricated in the assembled state. The SMM CMG device was fabricated using processes described in U.S. Pat. No. 5,084,084 for "Use of Chemical Mechanical Polishing in Micromachining", and several publications. The papers include "Characterization of Electrothermal Actuators and Arrays Fabricated in a Four-Level, Planarized Surface-Micromachined Polysilicon Process," J. H. Comtois, M. A. Michalicek and C. C. Barron, 1997 International Conf. On Solid State Sensors and Actuators, Chicago, Ill., Jun. 16– 19, 1997, Vol. 2, pp. 769–772; "Fabricating Micro-Instruments in Surface-Micromachined Polycrystalline Silicon," J. H. Comtois, M. A. Michalicek and C. C. Barron, Proceedings of the 43$^{rd}$ International Instrumentation Symposium, Instrument Society of America, 1997, pp. 169–178; and "Multi-Level Polysilicon Surface Micro-Machining Technology: Applications and Issues," ASME 1996 International Mechanical Engineering Congress and Exposition, Nov. 17–22, 1996, Atlanta, Ga., AD-Vol. 52, pp. 751–759. The processing technology necessary to produce these devices is within the skill in this art.

The discussion below is divided into several sections. The first section discusses the stronglinks and discriminators; the next two sections discuss the design, fabrication and test results of the device. The last section discusses alternative embodiments of the invention. The various references referred to in this specification are incorporated by reference herein in their entirety.

Stronglinks and DMG Discriminators

Stronglinks consist of four primary elements: drivers, discriminator mechanisms, couplers, and monitors. Drivers are linear or rotary actuators that are used to drive discriminator mechanisms. Discriminators are mechanical mechanisms that function as a coded locking device. Discriminator mechanisms are designed to irrevocably fail and render the device inoperable if the wrong drive signals are sent to the device. Typically, a 24 bit code is used to unlock discriminators. Couplers provide a path for energy or information transmission; this path can be optical, magnetic, electrical or mechanical. If the correct code is received by the stronglink, the drivers unlock the discriminator mechanism and drive the couplers into proper alignment position to pass an energy or information signal through the device. Monitors are used to interrogate the state of the device.

Figure 1:
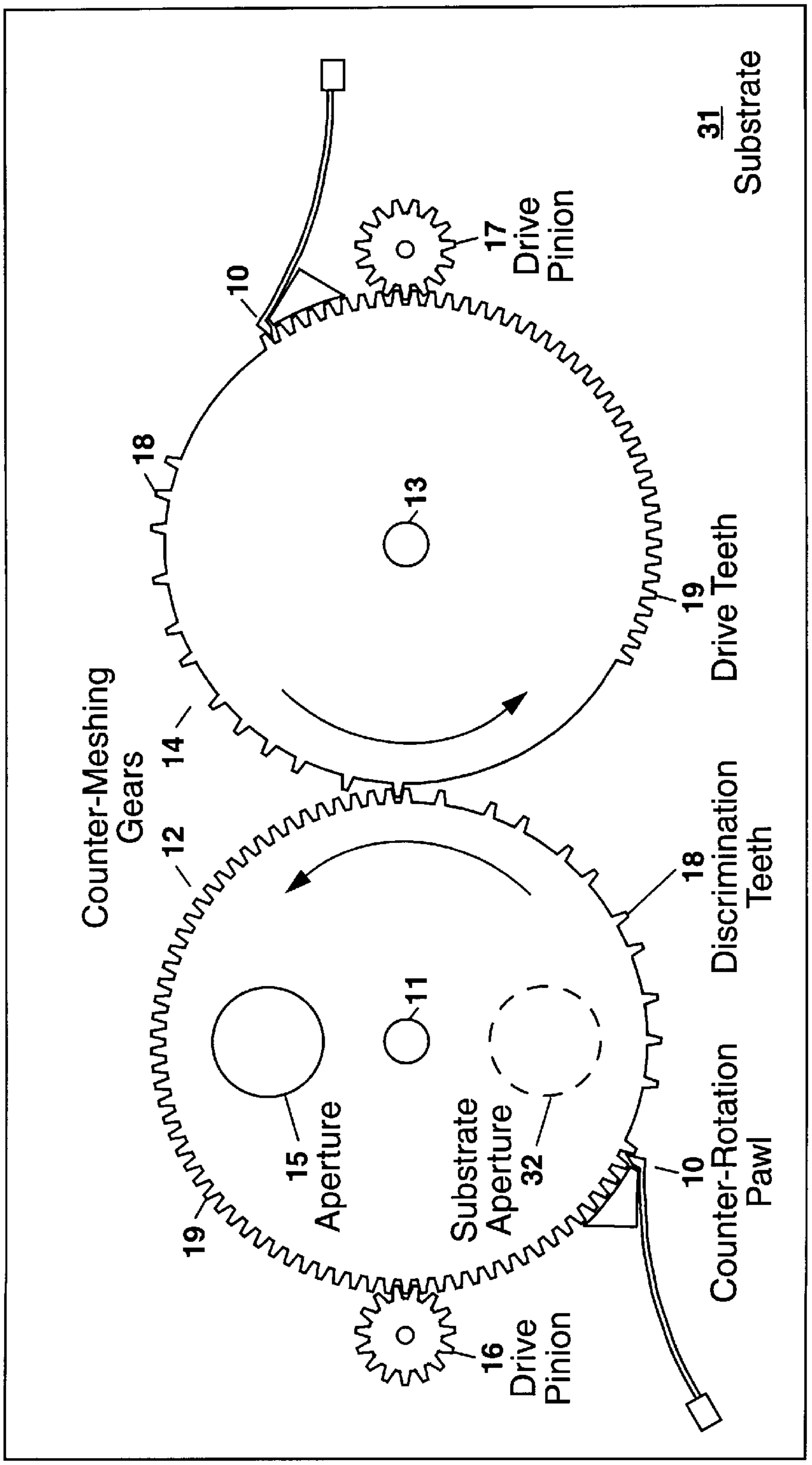
FIG. 1 is a vertical diagrammatic view of one embodiment of the invention.

A counter-meshing gears discriminator mechanism consists of two separately driven gears and two counter-rotation pawls. Each gear is driven by a separate actuator in the same rotational direction by a set of drive signals that drives each gear in specific increments in a specific sequence relative to each other. FIG. 1 illustrates the basic CMG configuration. The left and right CMGs 12 and 14 are driven in the same direction by their respective pinion gears 16 and 17 about their hubs 11 and 13 through which extend pins from the underlying substrate 31. Both CMGs have continuous drive gear sections 19 and discrete and spaced discrimination gear sections 18. Also shown are the counter-rotation pawls 10, that prevent rotation in the opposite direction, here clockwise. As the left CMG is rotated into proper position in reference to a corresponding aperture 32 in the substrate, the aperture 15 will enable the transmission of energy or information therethrough once the position has been reached.

Figure 2:
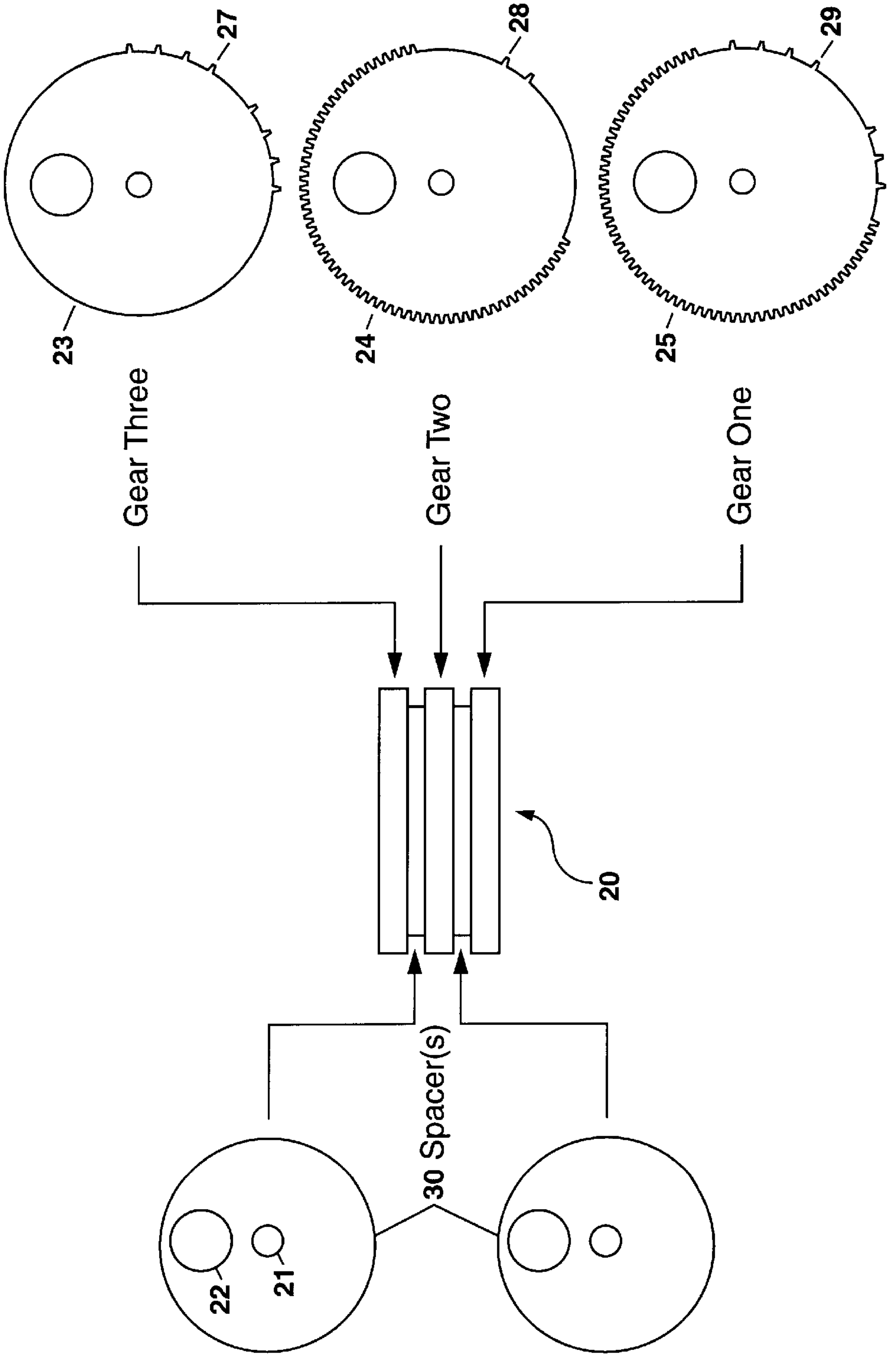
FIG. 2 is a drawing showing the various levels of a five level composite gear.

Each counter-meshing gear is a composite consisting of five layers; three gear layers each separated by a spacer layer. The five layers are assembled and fastened together so there is no relative motion between the individual layers. FIG. 2 shows the components of a CMG 20 with two spacer layers 30 separating the three geared layers 23, 24 and 25. The apertures and hubs 22 and 21 are as above. The various discrimination teeth on the three levels, 27, 28 and 29 make up the combined pattern of discrimination teeth for that counter-meshing gear. The other CMG will have a different configuration of discrimination teeth, such that, as the two CMGs pass by each other in the correct sequence of rotations, they will not interfere. FIG. 2 is a schematic diagram only. The various layers are being formed one on top of the other rather than being separately formed and then stacked and glued later.

Figure 3:
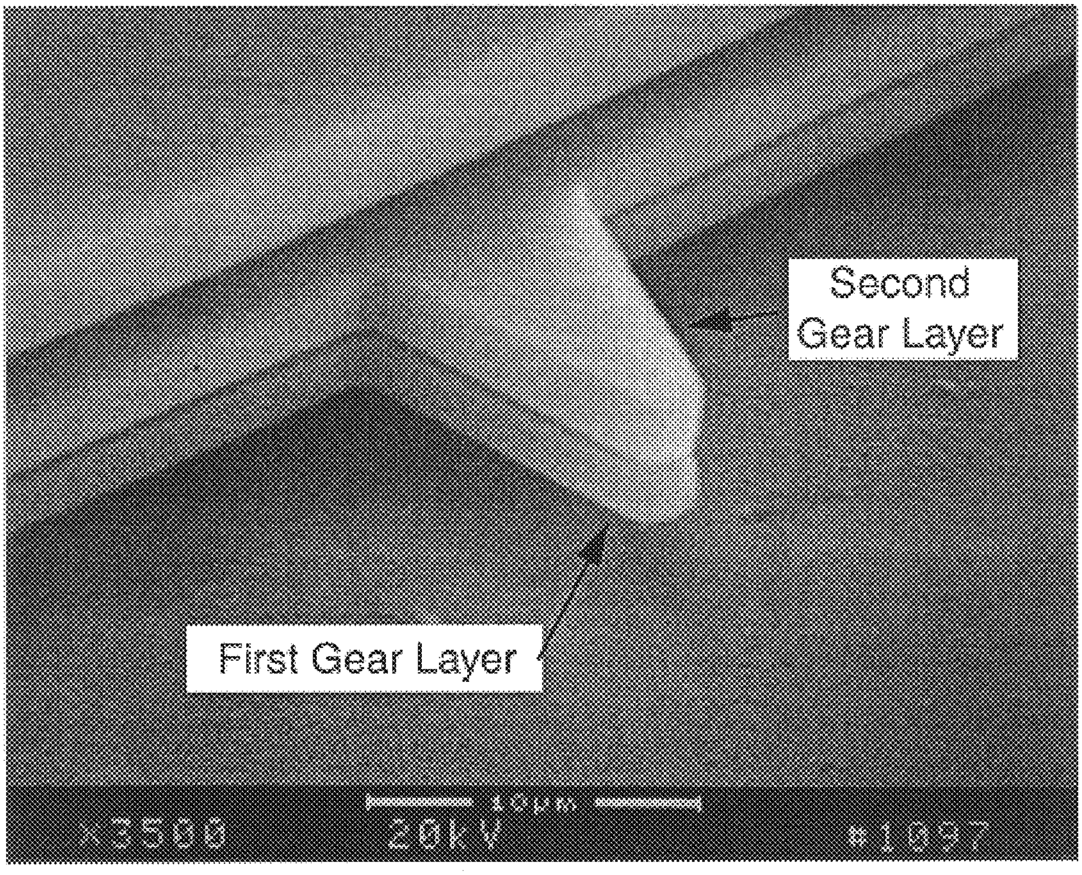
FIG. 3 is a microphotograph of discrimination teeth on the first and second gear layers.

The three gear layers are configured so that a coded pattern is developed by the way the teeth are positioned in the vertical stack. A design rule limits the number of teeth in each vertical stack position to a maximum of two teeth and a minimum of one tooth for this particular process. For example, in the first stack position of the composite gear, there might be a tooth on the first gear layer, a tooth on the second gear layer, and no tooth on the third gear layer as shown in FIG. 3. Or there might be one tooth on the second gear layer, one tooth on the third gear layer, and no tooth on the first layer like that shown in FIG. 4. The design rule enables a code to be established in the composite gears so that by indexing the gears in proper sequence, the teeth will pass over or under one another without interference (FIG. 5). If the wrong indexing sequence is used, the teeth on the composite gears interfere which results in a device lock up.

Figure 6A:
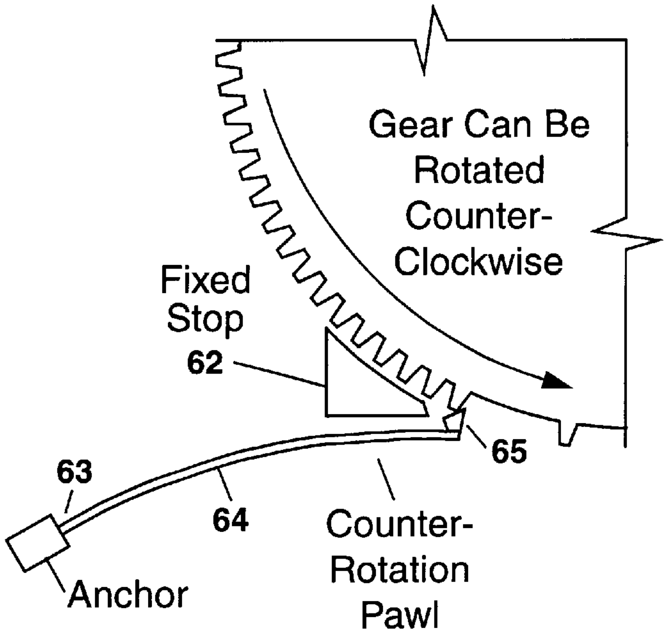
FIGS. 6A and 6B show one embodiment of the pawl means and its operation.
Figure 6B:
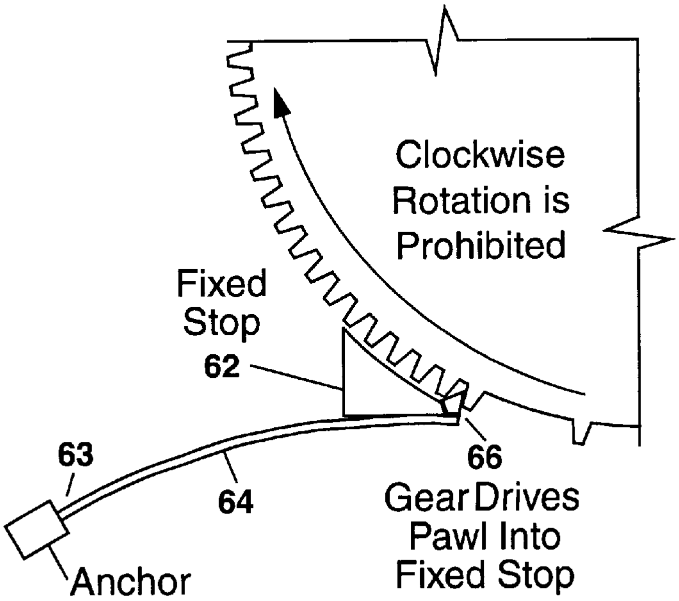

Complete lock-up of the device also requires the use of counter-rotation pawls to prevent rotation in the opposite direction to escape the lock-up. These devices limit the rotation of the gears to one direction as shown in FIG. 6. There are several designs utilized for counter-rotation pawls; the one shown in FIG. 6 is a cantilever beam 64 anchored at one end 63 and fabricated with a gear tooth 65 on the free end. Positioned next to the beam is a fixed stop 62. As the gear 61 rotates in the counter-clockwise direction, the beam deflects and the tooth ratchets through the teeth on the gear. The gear cannot be driven in the clockwise direction since the tooth on the end of the beam is driven into the fixed stop and wedged into position 66. This action prohibits the gear from turning in that direction.

If the wrong drive signals are sent to the actuators, the composite gears are indexed into a position where the teeth interfere. At this point, the driven composite gear attempts to drive the other composite gear the opposite direction. Counter-rotation pawls prohibit this rotation and render the device irrevocably locked up. The CMG device is designed to immediately lock-up if any one of the 24 bits that make up the drive signals is incorrect.

SMM CMG Design and Fabrication

Figure 7:
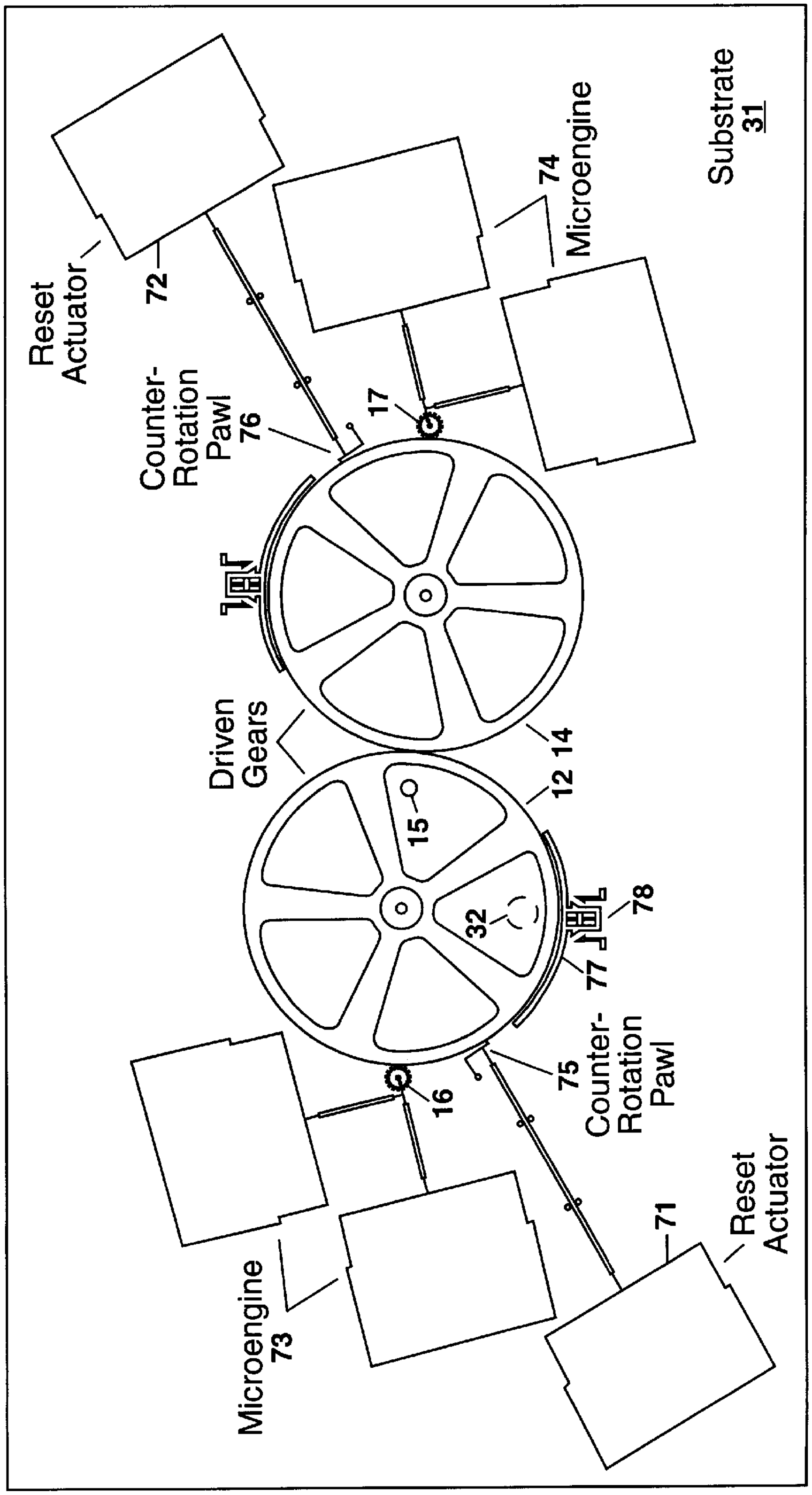
FIG. 7 is a top drawing view of a complete discriminator mechanism.

The SMM CMG device shown in FIG. 7 is fabricated using processes developed at Sandia National Laboratories, as referenced above. Four separate layers of polysilicon are deposited onto a silicon substrate 31 and used to fabricate the device. The first polysilicon layer is used as an electrical ground plane and the other three layers are used to fabricate the structural elements. For example, the first, second and third gear layers are constructed from the second, third and fourth polysilicon layers, respectively. The two spacers are formed in intermediate steps after the formation of the first and second gears. The device occupies a 4.7 millimeters by 10 millimeters area. The preferred device consists of CMG, two rotary actuators (used to drive the CMG), two counter-rotation pawls, and two linear actuators (used to reset the pawls for testing purposes).

In FIG. 7 are shown the two CMGs 12 and 14 and their pinion gears 16 and 17 that are driven by the electrostatic comb drive microengines 73 and 74. Also shown are alternative counter-rotation pawls 75 and 76 with their own microengines 71 and 72, as well as the shim 77 and the shim holder 78 discussed below.

Figure 8:
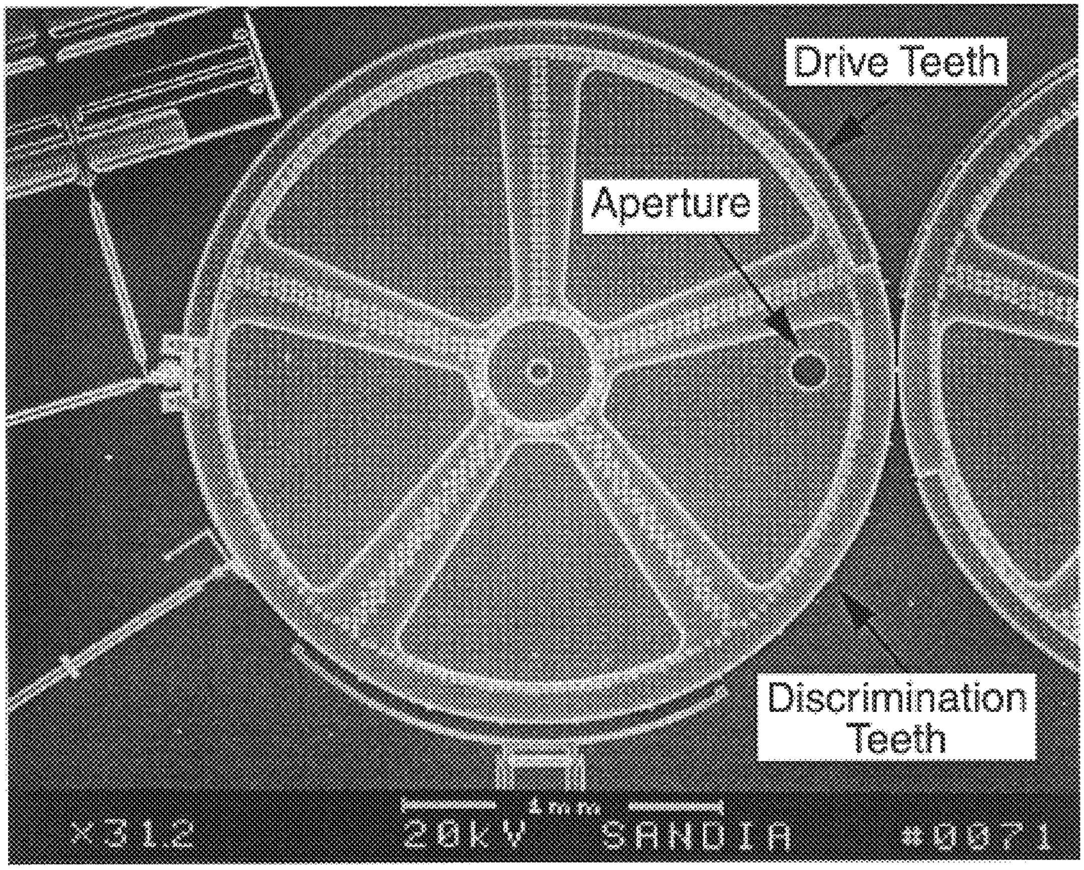
FIG. 8 is a microphotograph of an enlarged area of a discriminator mechanism showing an aperture for an energy path or information flow.

The CMG are 2 millimeters in diameter and contain two different sets of teeth, drive teeth and discrimination teeth (FIG. 8). The drive teeth are used to rotate the gears, and the discrimination teeth are used for the coded pattern. Drive teeth are positioned around roughly half the perimeter of each gear. They are fabricated using two polysilicon layers and are 2.5 micrometers thick. The design for the drive teeth is based on a 450 tooth gear with a 20 degree pressure angle. An involute profile is used for the tooth definition.

Figure 4:
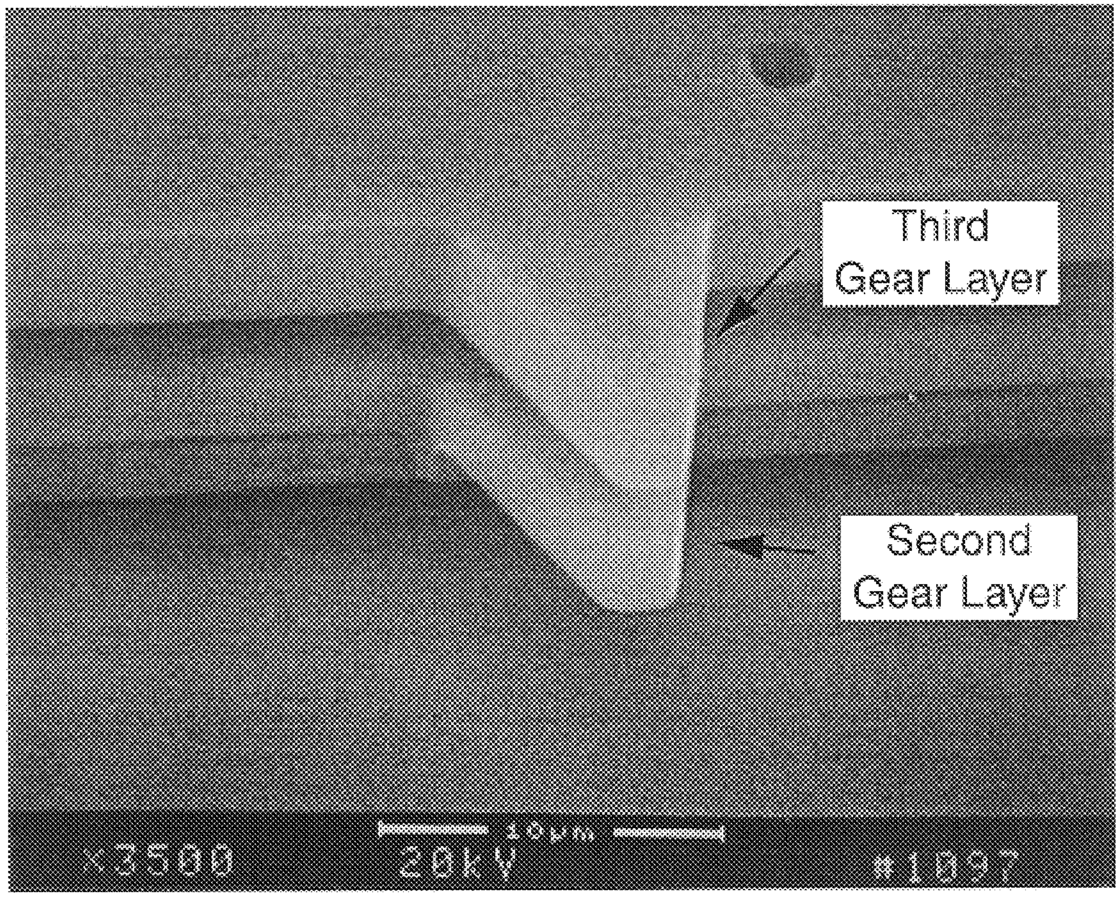
FIG. 4 is a microphotograph of discrimination teeth on the second and third gear layers.
Figure 5:
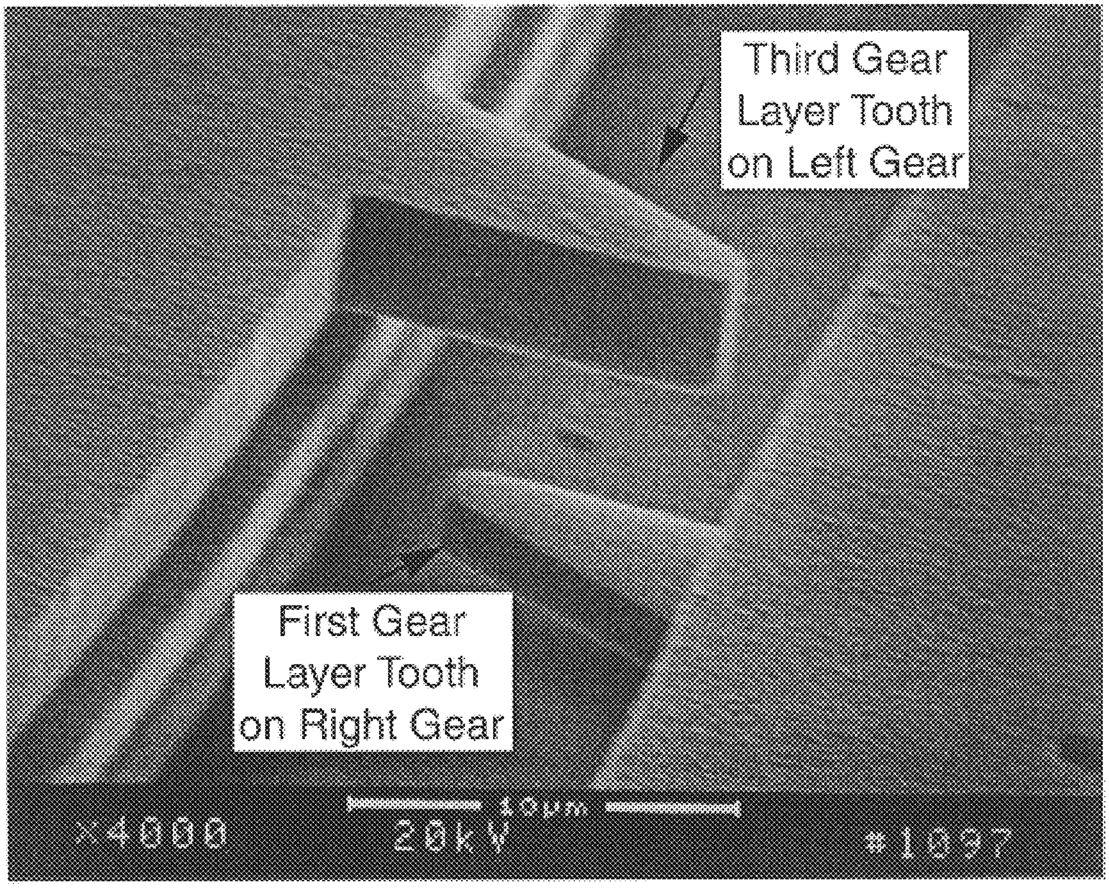
FIG. 5 is a microphotograph of the engagement area between the CMGs for the countermeshing discrimination teeth.

The discrimination teeth are located on three polysilicon layers as previously shown in FIGS. 3, 4, & 5. A gap is fabricated between each layer to mitigate unwanted interference that might occur if the gears were to tilt in the plane of fabrication during operation. The tooth thickness' for the second, third and fourth polysilicon layers are 1, 1.5 and 2 micrometers, respectively. The space between the teeth on the second and third layers is 0.5 micrometers. It is critical that at least this much spacing be maintained to prevent interference between teeth from different levels. The space between the teeth on the third and fourth layers is 2 micrometers. The pitch between each composite tooth is 12 degrees.

Figure 9:
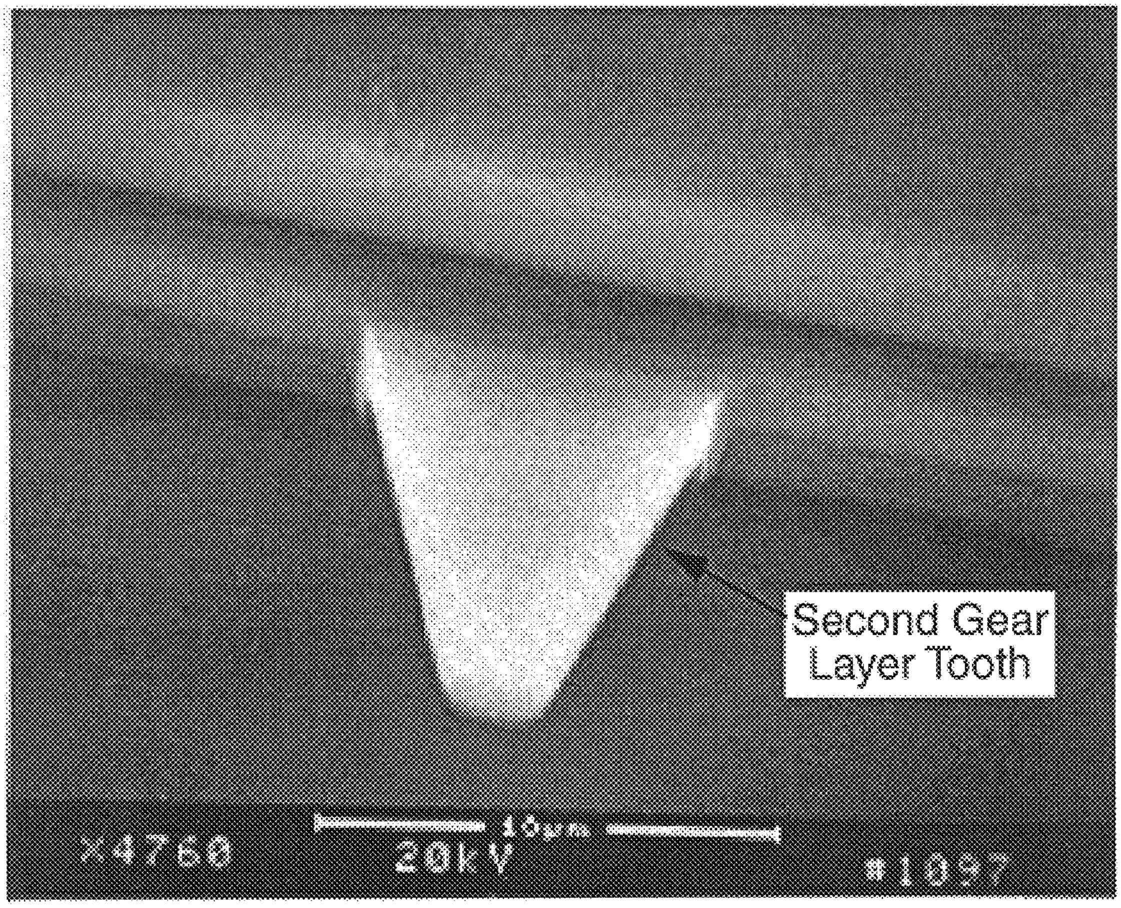
FIG. 9 is a microphotograph of a discrimination tooth that is formed with no tooth below it.
Figure 10:
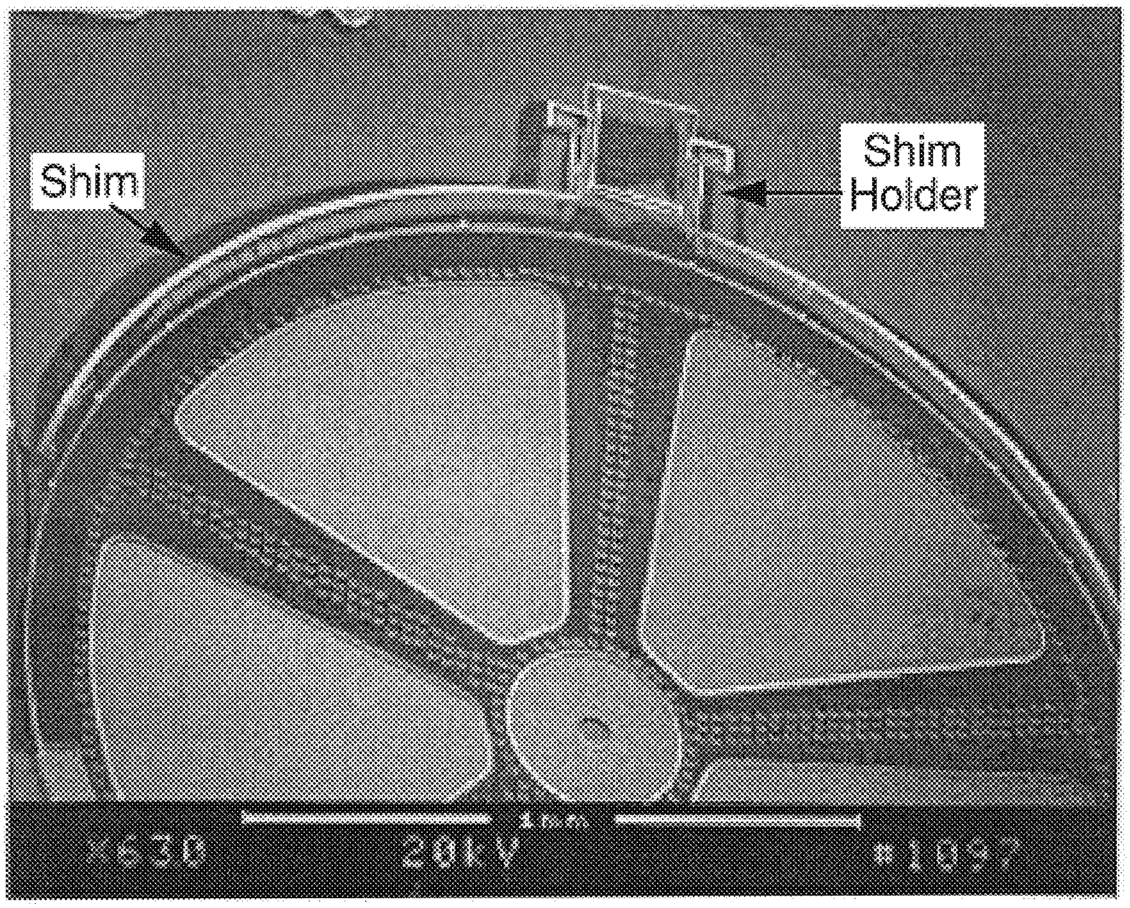
FIG. 10 is a microphotograph of the shim and shim holder used to fabricate teeth such as that in FIG. 9 showing the shim extending all the way around and under the region where the discrimination teeth will be formed.
Figure 11:
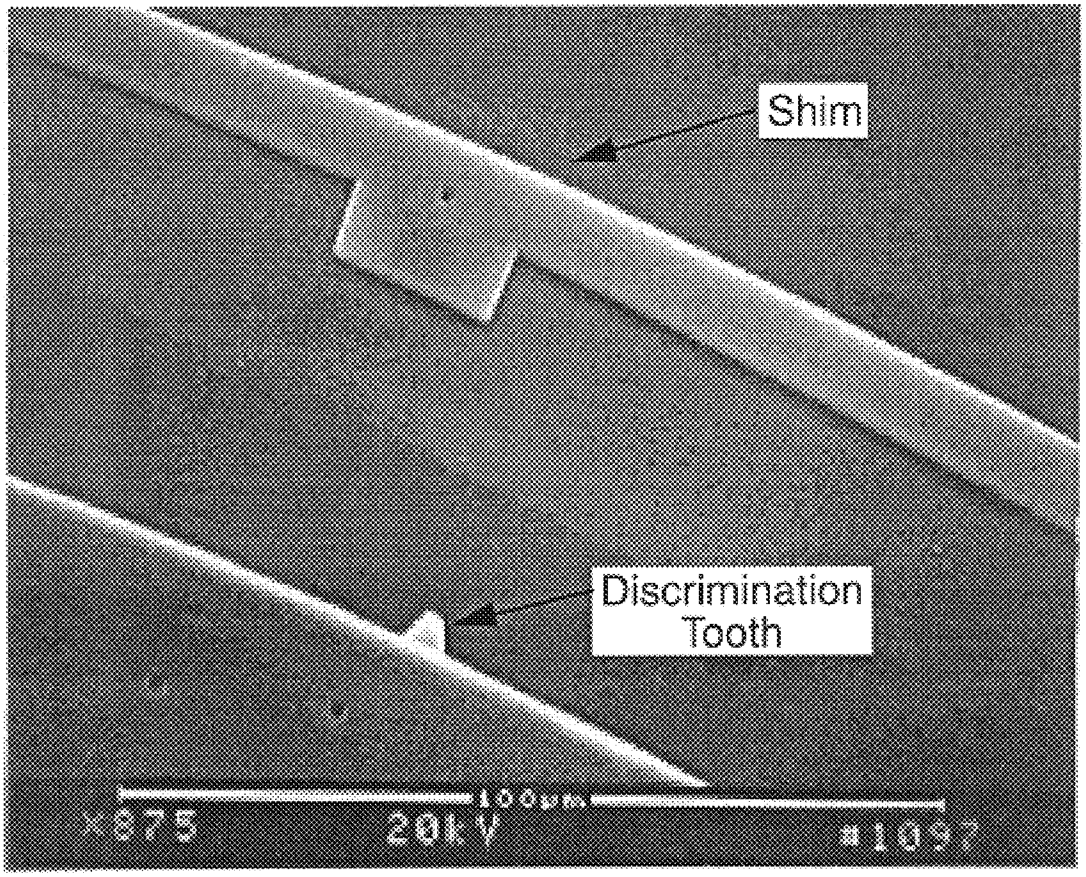
FIG. 11 is a microphotograph of a tooth fabricated above the shim.
Figure 12:
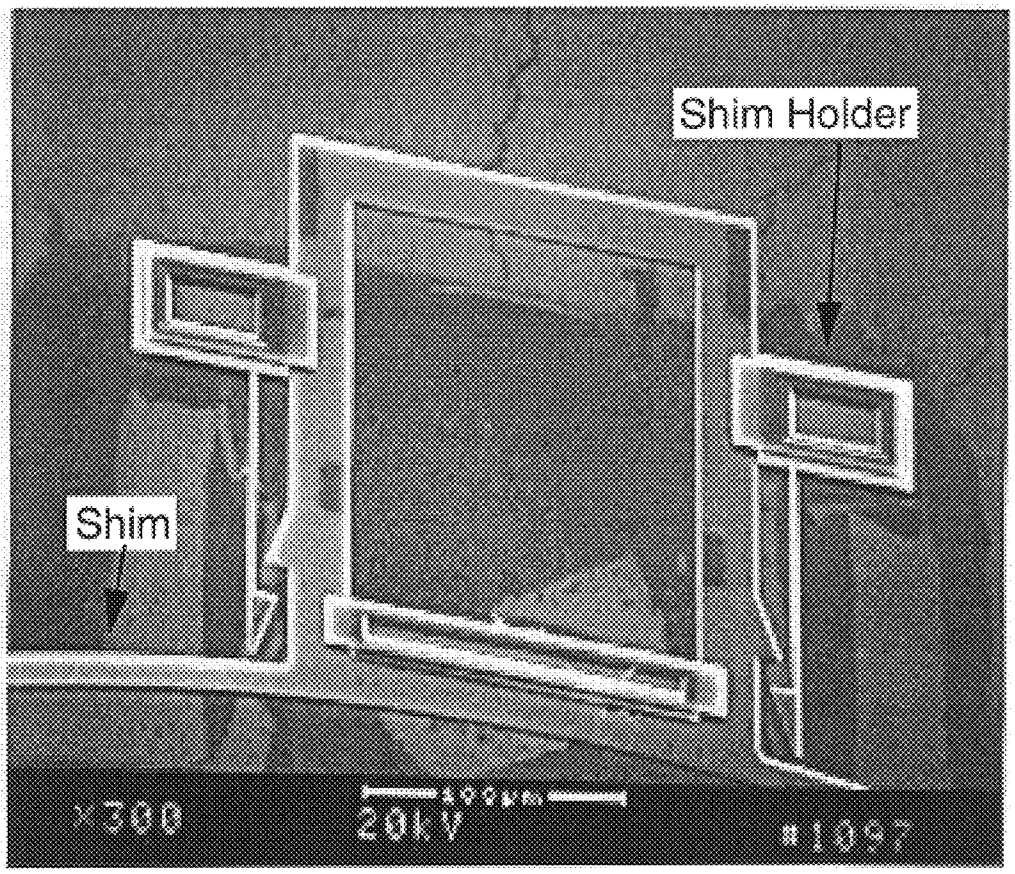
FIG. 12 is a microphotograph of the shim positioned in the shim holder.

The mechanical structures are fabricated by standard SMM techniques. Polysilicon and silicon dioxide (SiO2) layers are deposited, followed by lithography, development, and etching processes which are used to define the structures. Silicon dioxide is used as a sacrificial layer and deposited between polysilicon layers. The sacrificial layer is wet etched during the final release process using a hydrofluoric acid solution that does not affect the polysilicon. As the materials are deposited they conform to the topography of the underlying surface. Conformal deposition posed a problem in defining some of the coded discrimination teeth. For this design, some parts of the code required teeth on the third polysilicon layer in areas where there are no underlying teeth in the second polysilicon layer (FIG. 9). To deposit the third layer in the correct plane a removable shim was designed (FIGS. 10 & 11). This shim was positioned one micrometer from the dedendum circle of the gear. The shim is designed to act as a support for the third polysilicon layer as it is built up during the chemical vapor deposition (CVD) process. After the device is released, the shim is mechanically moved with a probe into a constraint device that holds it in a neutral position away from the CMG device (FIG. 12). This somewhat awkward technique of using a shim could probably be omitted with more sophisticated SMM processing techniques, such as the five level SMM process disclosed in U.S. Ser. No. 09/053,569 for a "Method for Fabricating Five-Level Microelectromechanical Structures and Microelectromechanical Transmission Formed Thereby."

A chemical mechanical polishing (CMP) process is used to planarize the silicon dioxide layer between the third and fourth polysilicon layers. After the CMP process is completed, the surface is left completely flat and parallel to the wafer substrate. This process mitigates the conformal deposition problems mentioned above. Thus, we encountered no processing problems in fabricating discrimination teeth in the fourth polysilicon layer in areas where discrimination teeth are absent below them (FIG. 5).

To fully unlock the discriminator mechanism, each gear must be rotated in a proper indexing sequence through 144 degrees. A 100 micrometer diameter aperture is fabricated in the left gear to represent a stronglink energy coupler. Once the discriminator mechanism is unlocked, rotating the left gear an additional 12 degrees aligns the aperture into the open position. If this device were to be used for a stronglink application, post processing steps would be needed to deposit a metal layer on the gear to reflect optical energy and a wafer back etch process would be needed to provide an optical path through the silicon substrate.

The drivers used to rotate the gears are rotary actuators known as Microengines that can produce greater than 25 pN-m output torque. A second design obstacle encountered pertained to the control of Microengines. The CMG design requires accurate twelve degree indexing of each gear to unlock the discriminator. Presently, a feedback system for these actuators is not yet available; however, work is underway to develop one. To overcome our control problem we took advantage of the inherent tendency of a Microengine to rotate one complete rotation. This is due to the folded-beam spring design that tends to restore the suspended comb structure to its initial position under light loading conditions. In addition, the drive signals can be tailored to achieve full rotation indexing. The Microengine is described more fully in U.S. Pat. No. 5,631,514.

To achieve proper indexing of the CMG, pinions 75 micrometers in diameter containing 15 teeth were designed. The CMG drive tooth design is based on a 450 tooth gear. By rotating the pinion one full revolution, twelve degree indexing is attained:

$$\theta = N_p / N_g 360° \quad (1)$$

where $N_p$ is the number of teeth on the pinion, $N_g$ is the number of teeth on the gear, and θ is the index angle. The disadvantage to this approach is it requires the diameters of the CMG to be large which increases the size of the device and drive torque requirements to operate it.

Figure 13:
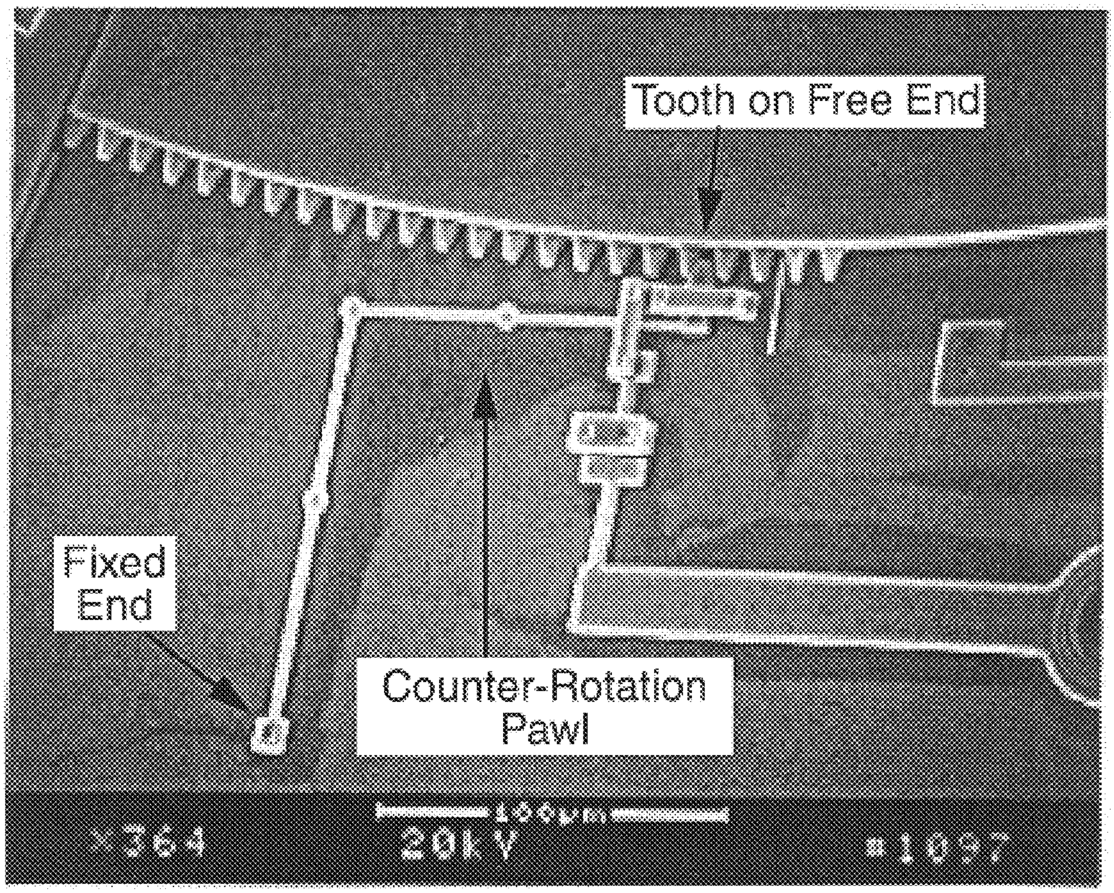
FIG. 13 is a microphotograph of a counter rotation pawl.
Figure 14:
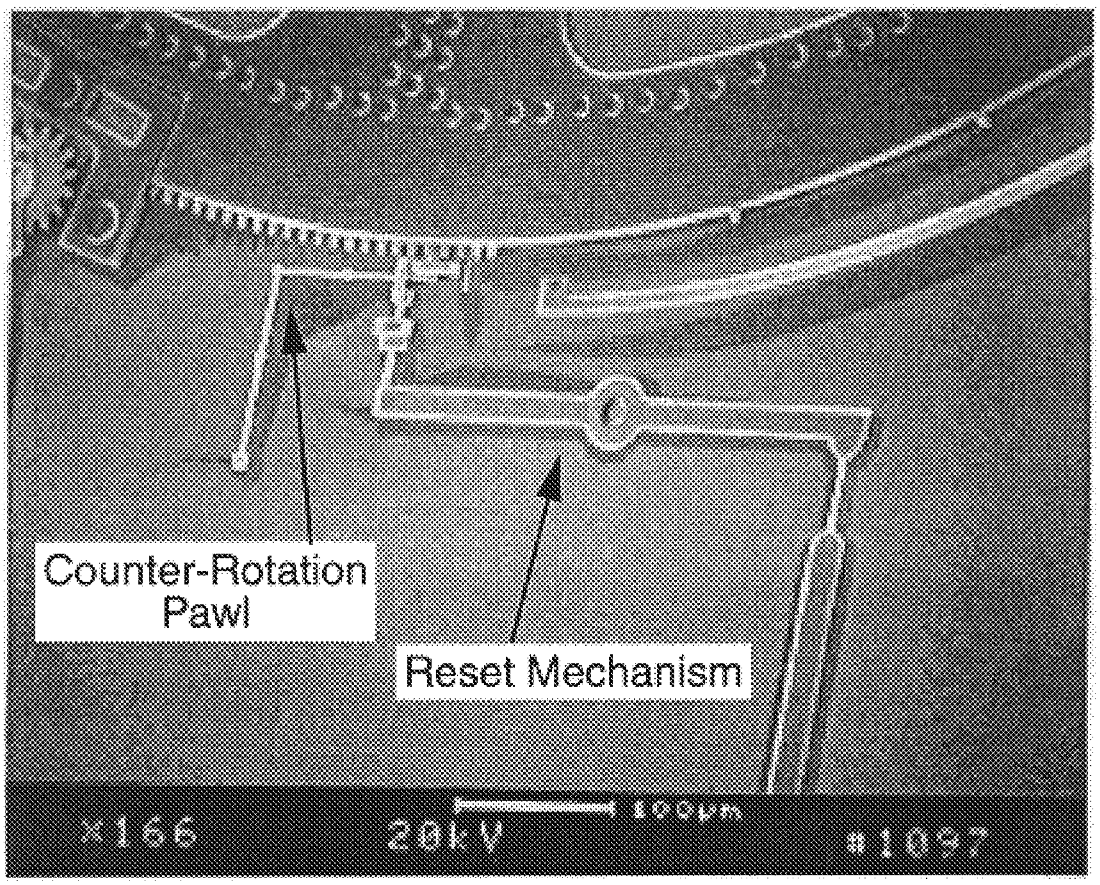
FIG. 14 is a microphotograph of a reset mechanism for the pawl.

Stronglink discriminator mechanisms are designed to operate one time. Once actuated, the device remains locked in position. This is accomplished by incorporating a stop that prevents the CMG from rotating past the fully actuated position. The counter-rotation pawls prohibit counter rotation hence the device becomes locked in place when fully actuated. A right-angled beam design was used for the counter-rotation pawl design to achieve the correct spring constant (FIG. 13). A notch was designed in the tooth at the free end of the beam. This notch catches a support beam affixed to the substrate during an attempt to drive the gear in the clockwise direction. To reset the device, the counter-rotation pawls must be withdrawn and the drive signals sent in the reverse order. Reset mechanisms were added to the CMG design to afford a testing capability. The reset design utilizes a linear comb-drive actuator to drive a linkage mechanism shown in FIG. 14 to completely disengage the pawl.

Results

After fabrication, the devices were placed on a probe station and visually inspected for defects. The shims used to aid in fabricating the discrimination teeth were repositioned manually into shim holders as shown in FIG. 12. The shim holder locks the shim into a neutral position so that it does not interfere with device operation. Visual inspection of the discrimination teeth verified the shims worked as designed, ie., the teeth on the third polysilicon layer were fabricated in the correct plane.

A probe card that contains thirteen probes was used to provide electrical connections for testing. Twelve probes are used to supply electrical energy to the two rotary actuators and two linear actuators and one probe is used for an electrical ground. Our test set up includes a PC, LabView® software and analog output card, amplification hardware, and a break out box for electrical connections.

The device was initially tested by manually entering the 24 bit drive signal one bit at time. No problems were encountered indexing the gears. Next we developed a control program which enabled us to adjust the angular velocity of the drive pinions and input the entire 24 bit code automatically. Our results were exceptional. We ran many tests varying the pinion speed from 1 revolution per second to 500 revolutions per second with the CMG device operating as designed. With the pinion speed set at 500 revolutions per second we were able to input the entire 24 bit drive signal and actuate the device in 50 milliseconds. To reset the device, the linear reset actuators were energized disengaging the counter-rotation pawls. The CMG were then reset by driving the gears in the reverse direction using the reverse order of the 24 bit code.

Next the device was tested to verify whether or not the discriminator fails if the wrong drive signals are sent. An incorrect code was entered where the teeth on the first mechanical polysilicon layer were tested. The device immediately locked up. The counter-rotation pawls locked the device into position and we were not able to drive either Microengine in forward or reverse directions to unlock the device. Next we reset the device using the reset mechanisms and proceeded to verify that the teeth on the other two polysilicon layers functioned properly. These tests verify the lock-up feature functions as designed.

Alternative Embodiments

To attain the proper gear indexing, Microengine output gears (pinions) were driven one complete revolution. This approach worked quite well, however, the diameters of the CMG must be large enough to accommodate sufficient drive teeth and discrimination teeth to drive the gear and discriminate the code. For the SMM CMG device described above, the pinions were designed with 15 teeth. For the left CMG, thirteen indexing events are needed for code discrimination and aperture alignment. Therefore, the counter-meshing gear must possess enough drive teeth to rotate the gear through the thirteen indexing events and accommodate the counter-rotation pawls. These factors led to the design of 2 mm diameter CMG.

To reduce the gear diameters without feedback control, two other design approaches can be utilized. The first design uses a transmission between the pinions and the CMG to tailor indexing. Full revolution pinion indexing is still employed with an appropriately geared transmission to generate a design specific CMG rotation. With this approach we can reduce the CMG diameters 75 percent to 500 micrometers. There are two disadvantages with this approach, the transmission adds additional loading due to frictional effects and additional die area is needed to accommodate the transmission. Nevertheless, we can still reduce the overall die area needed for the device by 50 percent with this design approach.

The second approach uses full rotation pinion indexing with a pinion having only one tooth. The tooth is designed so that the contact ratio between the pinion and the CMG is one; thus, for every full rotation of the pinion, the CMG indexes one tooth. With this approach we can reduce the CMG diameters to 300 micrometers. We have fabricated CMG designs with this approach and have encountered problems with impacts between the tooth on the pinion and teeth on the gear. If the gear rotates too much or too little, collisions between the teeth occur. Currently we are investigating a design to position the CMG correctly with the counter-rotation pawls to mitigate this problem.

Future work will incorporate a different energy coupling mechanism. We plan to integrate a Micro-Flex pop-up mirror with the CMG design. This mechanism is described in U.S. Pat. No. 5,959,375. This device will redirect a beam of light traveling parallel to the substrate into an orientation normal to the substrate. The discriminator will be used to unlock the device and actuate the mirror. The device could be used as a light switch with a mechanical lock. Alternatively, illumination from the backside of the substrate could be revealed to the front side of the discriminator if apertures in the substrate (32) and one or both of the CMGs (15) are brought into alignment following the application of the corrected code. This light could be used directly as an energy source to affect a result at a downstream location or could be used as an information carrier. In yet another alternative, mechanical energy could be coupled out of the discriminator by using a pin or arm that is attached to the upper surface of one of the CMGs and extending thereabove to interact with another mechanical component once that CMG has rotated into its final correct position.

It can be appreciated, therefor, that the invention herein of a surface micromachined discrimination device with countermeshing gears provides for a stronglink suitable for use in safety systems associated with High Consequence Events at greatly reduced cost and at least equivalent reliability when compared to prior art discrimination devices. The true scope of the invention is to be found in the appended claims.

What is claimed is:

1. A surface micromachined discriminator mechanism comprising:

- a silicon-based substrate from which extend first and second Si-based pins;
- first and second countermeshing composite Si-based gears (CMG) adapted to rotate in the same direction about the first and second pins, wherein each of the CMG has a first portion of its circumference that is provided with continuous gear teeth that are adapted to be driven by teeth of corresponding first and second pinion gears also rotating about pins extending from the substrate and each of the CMG has a second portion of its circumference that is provided with discrimination teeth that are disposed at regular intervals about the second portion and protrude therefrom at at least one of at least three levels along a vertical surface of the edge of the gear such that, as the countermeshing gears are driven past each other in a sequence of coded partial rotations, the discrimination teeth from the first and second CMG will pass each other without interference only if the correct sequence of coded partial rotations is utilized; and
- means to drive the pinion gears in response to a coded sequence of steps.

2. The mechanism of claim 1 additionally comprising pawl means that engage the continuous gear teeth on the CMG to prevent reverse rotation of the CMG.

3. The mechanism of claim 1 wherein the discrimination teeth of the first CMG are formed to interfere immediately with the teeth of the second CMG upon the occurrence of an incorrect step in the sequence of coded partial rotations applied to the mechanism.

4. The mechanism of claim 2 additionally comprising reset means to disable the pawl means.

5. The mechanism of claim 1 further including means to establish a pathway for a transmission of energy through the mechanism only if the correct sequence of coded partial rotations has been completed.

6. The mechanism of claim 5 wherein the energy is light and the pathway comprises apertures in the substrate and at least one of the CMG that become aligned for the transmission of light therethrough only after the correct sequence of coded partial rotations has been completed.

7. The mechanism of claim 5 wherein the transmission of energy is a transmission of light energy that carries information therewith.

8. The mechanism of claim 1 wherein the means to drive the pinion gears comprise electrostatic comb drives.

9. A surface micromachined discriminator mechanism comprising:

a silicon-based substrate from which extend first and second polysilicon pins;

first and second countermeshing composite polysilicon gears (CMG) adapted to rotate in the same direction about the first and second pins, wherein each of the CMG has a first portion of its circumference that is provided with continuous gear teeth that are adapted to be driven by teeth of corresponding first and second polysilicon pinion gears also rotating about third and fourth pins extending from the substrate and each of the CMG has a second portion of its circumference that is provided with discrimination teeth that are disposed at regular intervals about the second portion and protrude therefrom at at least one of at least three levels along a vertical surface of the edge of the gear such that, as the countermeshing gears are driven past each other in a sequence of coded partial rotations, the discrimination teeth from the first and second CMG will pass each other without interference only if the correct sequence of coded partial rotations is utilized;

means to drive the pinion gears in response to a coded sequence of steps; and counter-rotation pawl means engaging with the continuous gear teeth to prevent reverse rotation of the CMG.

10. The mechanism of claim 9 further including means to establish a pathway for a transmission of energy through the mechanism only if the correct sequence of coded partial rotations has been completed.

11. The mechanism of claim 10 wherein the energy is light and the pathway comprises an aperture in the substrate and an aperture in one of the CMG that become aligned for the transmission of light therethrough only after the correct sequence of coded partial rotations has been completed.

12. The mechanism of claim 9 wherein the means to drive the pinion gears comprise electrostatic comb drives.

* * * * *